US012584888B2

(12) United States Patent
Alerwi et al.

(10) Patent No.: US 12,584,888 B2
(45) Date of Patent: Mar. 24, 2026

(54) AUTO-CALIBRATION SYSTEM AND METHOD FOR CONTINUOUS ACOUSTIC EMISSION BASED STRUCTURAL HEALTH MONITORING

(71) Applicant: SAUDI ARABIAN OIL COMPANY, Dhahran (SA)

(72) Inventors: Maher Hamed Alerwi, Dhahran (SA); Raed Samanoodi, Thuwal (SA); Layan Alaeddin AlSharif, Dhahran (SA); Abdulrahman Mohammed Alqahtani, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 336 days.

(21) Appl. No.: 18/509,505

(22) Filed: Nov. 15, 2023

(65) Prior Publication Data

US 2025/0155409 A1     May 15, 2025

(51) Int. Cl.
*G01N 29/07*     (2006.01)
*G01N 29/30*     (2006.01)
*G01N 29/34*     (2006.01)

(52) U.S. Cl.
CPC ............. *G01N 29/07* (2013.01); *G01N 29/30* (2013.01); *G01N 29/348* (2013.01); *G01N 2291/011* (2013.01); *G01N 2291/023* (2013.01); *G01N 2291/0289* (2013.01)

(58) Field of Classification Search
CPC ...... G01N 29/07; G01N 29/30; G01N 29/348; G01N 2291/011; G01N 2291/023; G01N 2291/0289

USPC .......................................................... 73/598
See application file for complete search history.

(56) References Cited

U.S. PATENT DOCUMENTS

| | | | | |
|---|---|---|---|---|
| 7,024,315 | B2 * | 4/2006 | Giurgiutiu | ............. G01N 29/46 |
| | | | | 702/33 |
| 11,162,864 | B2 | 11/2021 | Rose | |
| 2012/0330569 | A1 * | 12/2012 | Singh | ................... G01N 29/069 |
| | | | | 702/39 |

(Continued)

FOREIGN PATENT DOCUMENTS

| | | | |
|---|---|---|---|
| JP | 6652455 | B2 | 2/2020 |
| RU | 2576343 | C2 | 2/2016 |

*Primary Examiner* — Peter J Macchiarolo
*Assistant Examiner* — Rodney T Frank
(74) *Attorney, Agent, or Firm* — Leason Ellis LLP

(57) ABSTRACT

A structural health monitoring system coupled to a structural material to be monitored comprises a pulsar coupled to the structural material that is configured to emit acoustic waves, a plurality of acoustic wave sensors coupled to the structural material and to receive acoustic waves generated by the pulsar that have propagated through the structural material, and a command center having at least one processor communicatively coupled to both the pulsar and the plurality of acoustic wave sensors, the command center being configured such as by code executing in the processor to control emissions of acoustic wave by the pulsar, and to receive detection signals produced by the plurality of acoustic wave sensors, the command center further being configured to continuously calibrate the system, including the pulsar and the plurality of acoustic wave sensors so as to reliably and accurately determine structural health of the structural material in real time.

20 Claims, 5 Drawing Sheets

(56)          References Cited

U.S. PATENT DOCUMENTS

2017/0328868 A1*  11/2017  Tat ........................... G01H 1/00
2023/0076885 A1     3/2023  Rudyk et al.
2025/0155409 A1*    5/2025  Alerwi .................. G01N 29/07

* cited by examiner

100

134

120

136

132

140

110

☐ Multiple Sensor Heads

▱ Pulsar

▱ Command Center

▱ Material being monitored

AUTO-CALIBRATION SYSTEM AND METHOD FOR CONTINUOUS ACOUSTIC EMISSION BASED STRUCTURAL HEALTH MONITORING

FIELD OF THE DISCLOSURE

The present disclosure relates to structural condition monitoring using acoustic waves, and more particularly relates to an auto-calibration system and method for continuous, autonomous emission-based structural health monitoring.

BACKGROUND OF THE DISCLOSURE

In many industries, it is vital to monitor the structural health of buildings, equipment and other infrastructure such as pipelines or pressure vessels. Effective monitoring requires accurate detection of changes in structural material properties and damage progression within such materials. One useful technique for inspecting structural health involves emission and detection of acoustic (e.g., ultrasonic) waves that travel though such materials. Conventional methods for inspecting pressure vessels and pipelines typically involve periodic, manual ultrasonic testing (UT), inline inspection (ILI), or guided wave inspection. These methods, although effective, are disruptive, time-consuming, and can only provide snapshots of the structural health at the time of testing.

In addition, conventional structural health monitoring systems and methods lack consistent reliability because they rely upon periodic calibration. Periodic calibration is susceptible to fluctuations in sensitivity and other parameters which can drift between periodic calibration times, leading to inaccuracies.

What is therefore needed is a structural health monitoring system and method that is consistently reliable and accurate, and therefore able to promptly determine structural damage, deterioration and/or other structural changes.

SUMMARY OF THE DISCLOSURE

In a first aspect, the present disclosure describes a structural health monitoring system coupled to a structural material to be monitored. The system comprises a pulsar coupled to the structural material that is configured to emit acoustic waves, a plurality of acoustic wave sensors coupled to the structural material and to receive acoustic waves generated by the pulsar and propagated through the structural material, and a command center having at least one processor communicatively coupled to both the pulsar and the plurality of acoustic wave sensors, the command center being configured to control emissions of acoustic wave by the pulsar, to receive detection signals produced by the plurality of acoustic wave sensors, and to continuously calibrate the monitoring system including the pulsar and the plurality of acoustic wave sensors so as to reliably and accurately determine the structural health of the structural material in real time.

In some embodiments of the system, the command center is further configured to instruct the pulsar to generate acoustic waves with a variety of frequencies and intensities, and assess a sensitivity of the plurality of acoustic wave sensors and the pulsar by determining whether signals produced by the plurality of acoustic wave sensors in response to the acoustic waves generated by the pulsar have a corresponding variety of frequencies and intensities. The command center can be further configured to generate an alert for a system check when it is determined that the signals produced by the plurality of acoustic wave sensors in response to the acoustic waves generated by the pulsar do not have a corresponding variety of frequencies and intensities.

In some embodiments of the system, the command center is further configured to instruct the pulsar to repeatedly generate acoustic waves with a single frequency and intensity at preset intervals, and to assess a reliability of the plurality of acoustic wave sensors and the pulsar by determining whether signals produced by the plurality of acoustic wave sensors in response to the acoustic waves generated by the pulsar show a consistent frequency and intensity level. The command center can be further configured to generate an alert for a system check when it is determined that the signals produced by the plurality of acoustic wave sensors in response to the acoustic waves generated by the pulsar do not show a consistent frequency and intensity level.

In further embodiments of the system, the command center is further configured to execute a calibration according to a first mode which includes: 1) Instructing the pulsar to generate acoustic waves with a variety of frequencies and intensities, and 2) assessing a sensitivity of the plurality of acoustic wave sensors and the pulsar by determining whether signals produced by the plurality of acoustic wave sensors in response to the acoustic waves generated by the pulsar have a corresponding variety of frequencies and intensities; and execute a calibration according a second mode which includes: 1) instructing the pulsar to repeatedly generate acoustic waves with a single frequency and intensity at preset intervals, and assessing a reliability of the plurality of acoustic wave sensors and the pulsar by determining whether signals produced by the plurality of acoustic wave sensors in response to the acoustic waves generated by the pulsar show a consistent frequency and intensity level. The command center can be further configured to instruct the pulsar to generate a defined base signal, compare a response of the plurality of acoustic wave sensors to the base signal with a previous response of the plurality of acoustic wave sensors to the base signal, and when the response of the plurality of acoustic wave sensors to the base signal differs from the previous response, executing the calibrations according to the first and second modes. The command center can also be configured to change the base signal when it is determined that the sensitivity and reliability of the plurality of wave sensors are as expected.

In another aspect, the present disclosure describes a method of monitoring structural health of a system coupled to a structural material performed by a processor configured with computer-executable instructions. The method comprises instructing a pulsar coupled to the structural material to emit acoustic waves, receiving responses to the acoustic waves generated by the pulsar and propagated through the material from a plurality of acoustic wave sensors, and continuously calibrating the system, including the pulsar and the plurality of acoustic wave sensors, so as to reliably and accurately determine the structural health of the structural material in real time.

In some implementations, the method further comprises instructing the pulsar to generate acoustic waves with a variety of frequencies and intensities and assessing a sensitivity of the plurality of acoustic wave sensors and the pulsar by determining whether signals produced by the plurality of acoustic wave sensors in response to the acoustic waves generated by the pulsar have a corresponding variety of frequencies and intensities.

In further implementations, an alert for a system check can be generated when it is determined that the signals produced by the plurality of acoustic wave sensors in response to the acoustic waves generated by the pulsar do not have a corresponding variety of frequencies and intensities.

In some implementations, the method further comprises instructing the pulsar to repeatedly generate acoustic waves with a single frequency and intensity at preset intervals and assessing a reliability of the plurality of acoustic wave sensors and the pulsar by determining whether signals produced by the plurality of acoustic wave sensors in response to the acoustic waves generated by the pulsar show a consistent frequency and intensity level.

In some implementations, the method further comprises instructing the pulsar to repeatedly generate acoustic waves with timestamps and determining a velocity of acoustic waves through the structural material based on a known distance between each of the plurality of acoustic wave sensors and the pulsar and timestamps of the signals received by the plurality of acoustic wave sensors. The command center can be further configured to localize structural damage in the structural material, when present, based on the determined velocity of acoustic waves through the structural material.

In some implementations, the method further comprises executing a calibration according to a first mode which includes: 1) instructing the pulsar to generate acoustic waves with a variety of frequencies and intensities, and 2) assessing a sensitivity of the plurality of acoustic wave sensors and the pulsar by determining whether signals produced by the plurality of acoustic wave sensors in response to the acoustic waves generated by the pulsar have a corresponding variety of frequencies and intensities, and executing a calibration according a second mode which includes: 1) instructing the pulsar to repeatedly generate acoustic waves with a single frequency and intensity at preset intervals, and assessing a reliability of the plurality of acoustic wave sensors and the pulsar by determining whether signals produced by the plurality of acoustic wave sensors in response to the acoustic waves generated by the pulsar show a consistent frequency and intensity level. In certain implementations, the method further comprises instructing the pulsar to generate a defined base signal, comparing a response of the plurality of acoustic wave sensors to the base signal with a previous response of the plurality of acoustic wave sensors to the base signal, and when the response of the plurality of acoustic wave sensors to the base signal differs from the previous response, executing the calibrations according to the first and second modes.

The base signal can be changed when it is determined that the sensitivity and reliability of the plurality of wave sensors are as expected.

These and other aspects, features, and advantages can be appreciated from the following description of certain embodiments and the accompanying drawing figures and claims.

DETAILED DESCRIPTION OF CERTAIN EMBODIMENTS OF THE DISCLOSURE

The present disclosure describes an acoustic emission system that continuously and automatically calibrates, and thereby provides accurate detection of changes in material properties and damage progression within the material which can be indicated by acoustic emissions. As described below, the calibration occurs in a plurality of modes, which ensure sensitivity and reproducibility checks, accurate damage locations and identification of waveform distortions over time.

Figure 1:
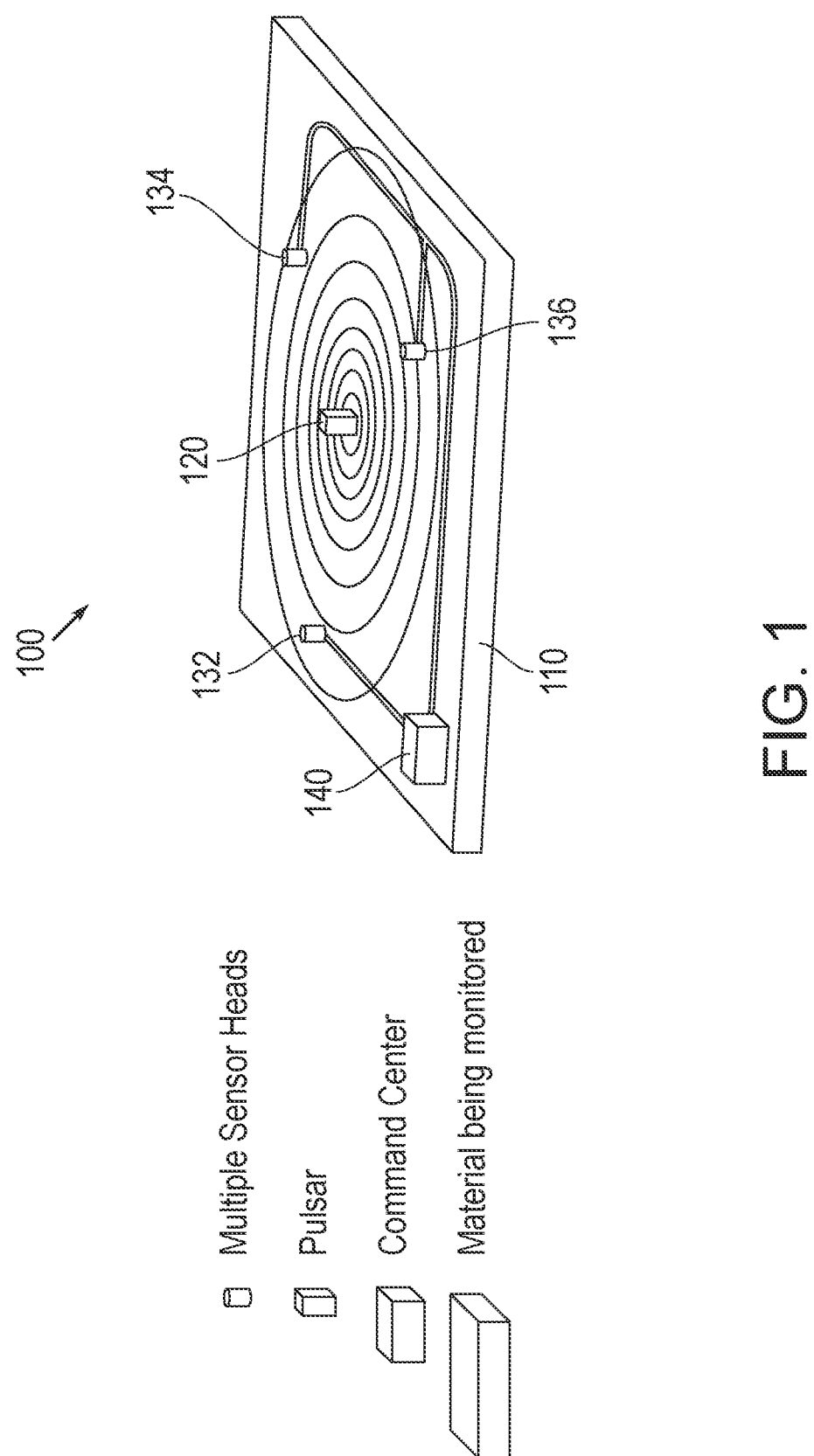
FIG. 1 is a schematic perspective view of an embodiment of an auto-calibrating system and for continuous acoustic emission based structural health monitoring according to the present disclosure.

FIG. 1 is a schematic perspective view of an embodiment of an auto-calibrating system and for continuous acoustic emission based structural health monitoring according to the present disclosure. As shown, the acoustic monitoring system 100 comprises, first, a material that is monitored 110, which, for example, can be a surface of an infrastructural component such as a pipeline or tank. Upon the monitored material 110 are a pulsar 120, a plurality of acoustic emission sensors 132, 134, 136 and a command center component 140. The pulsar 120 is a sound transducer that is designed to be able to generate different kinds of acoustic waves for system calibration. For example, the pulsar 120 can be designed to emit acoustic waves that correspond to the frequency range of the plurality of acoustic emission sensors. The acoustic emission sensors 132, 134, 136 are positioned around the area of the material 110 that is to be monitored. The positioning and number of the sensors 132, 134, 136 depend on the size and complexity of the monitored structure. The acoustic emission sensors 132, 134, 136 can be constructed using piezoelectric materials which convert pressure signals into electrical signals. There are a wide range of acoustic emission sensors that are available and that can be incorporated in the systems described herein. It is preferable for the sensors 132, 134, 136 to be able to detect a diverse range of sound frequencies and intensities. As one example, the Mistral Group of Princeton Junction, NJ manufactures an "intrinsically safe" acoustic emission sensor that is particularly tailored for structural safety monitoring in harsh environments and for oil and gas infrastructure specifically. This device, the model ISR3CA-HT has a frequency range of 10-100 KHz with a sensitivity range of 60-70 dB throughout this range.

Although three acoustic emission sensors 132, 134, 136 are shown, this number is merely for illustrative purposes and in other embodiments, a larger or smaller number of sensors can be employed. The command center 140 is a computing system or a computing device that includes a processor (or multiple processors) which executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system or device. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The processor of the commend center 140 is configured to execute code that include operation algorithms for governing the operation of the pulsar 120, such as using code provided from an associated memory unit. When the pulsar delivers a sound signal, the signal is received and converted by the plurality of acoustic emission sensors 132, 134, 136 in electrical signals which are received by the command center 140. The processor of the command center is configured to process and interpret the data received by the sensors. Upon interpretation, the command center 140 determines whether a potential failure (miscalibration) has occurred and executes remediation logic to alarm the operator in case a potential failure is detected.

During normal operation, the acoustic emission sensors 132, 134, 136 detect sounds originating from structural damages in the material 110. In contrast, during auto-calibration the acoustic emission sensors 132, 134, 136 detect sounds originating from the pulsar 120, which is operated by instructions from the command center 140. More specifically, the pulsar 120 serves as a synthetic acoustic emission source for system auto-calibration, and the command center 140, receives, processes and interpreting the data from the acoustic emission sensors 132, 134, 136. The processor of the command center 140 is configured to switch between four distinct modes of operation. These modes, respectively measure: 1) sensitivity; 2 reproducibility; 3) velocity of acoustic waves; 4) and base signal changes. The use of the different modes provides sensitivity and reproducibility checks, accurate damage localization, and identification of waveform distortions over time. These measures, acting together, enhance the reliability and efficiency of structural health monitoring.

Figure 2:
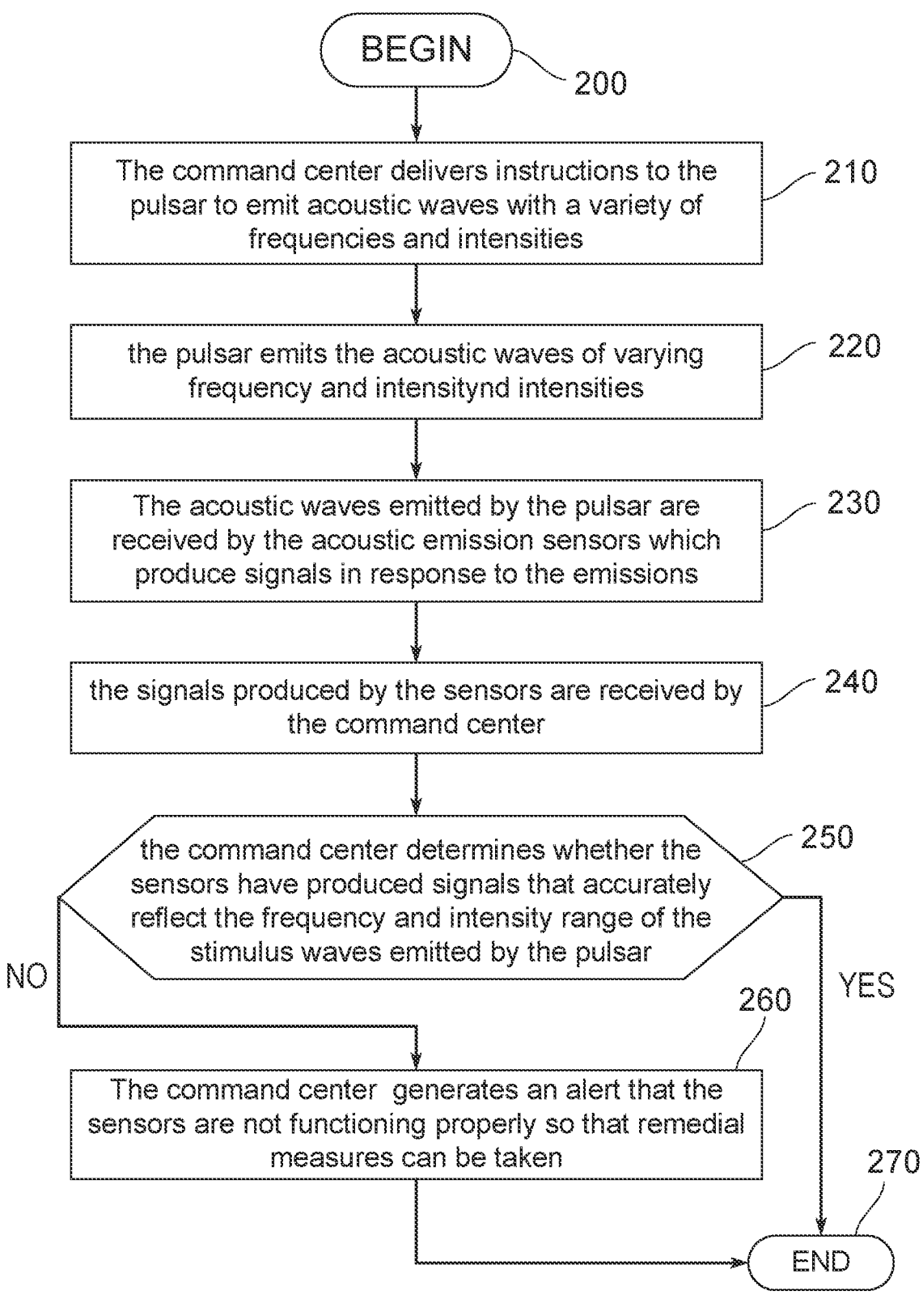
FIG. 2 is a flow chart of an embodiment of a first mode of auto-calibration of a system for continuous acoustic emission-based structural health monitoring according to the present disclosure.

FIG. 2 is a flow chart of an embodiment of a first mode of a method of auto-calibration of a system for continuous acoustic emission-based structural health monitoring according to the present disclosure. In this mode, the command center instructs the pulsar to emit varying combinations of intensities and frequencies across the sensor capabilities range. Referring to FIG. 2, in step 200, the method begins. In step 210, the command center 140 delivers instructions to the pulsar 120 to emit acoustic waves with a variety of frequencies and intensities. In step 220, the pulsar 120 emits the acoustic waves of varying frequency and intensity. In step 230, the acoustic waves emitted by the pulsar 120 are received by the acoustic emission sensors 132, 134, 136 which produce signals in response to the emissions. In step 240, the signals produced by the sensors 132, 134, 136 are received by the command center. In step 250, the command center 140 determines whether the sensors 132, 134, 136 produced signals that accurately reflect the frequency and intensity range of the stimulus waves emitted by the pulsar 120. If it is determined in step 250, that the sensor signals accurately reflect the stimulus waves, the method ends in step 270, as it is implicitly determined that the sensors 132, 134, 136 are functioning with proper sensitivity and range. If, in step 250, it is determined that the sensor signals does not accurately reflect the frequency and intensity range of the stimulus waves emitted by the pulsar 120, in step 260, the command center 140 generates an alert that one or more the sensors 132, 134, 136 are not functioning properly so that remedial measures can be taken (e.g., one or more sensors can be subjected to further testing and/or replaced). The method then ends in step 270.

Figure 3:
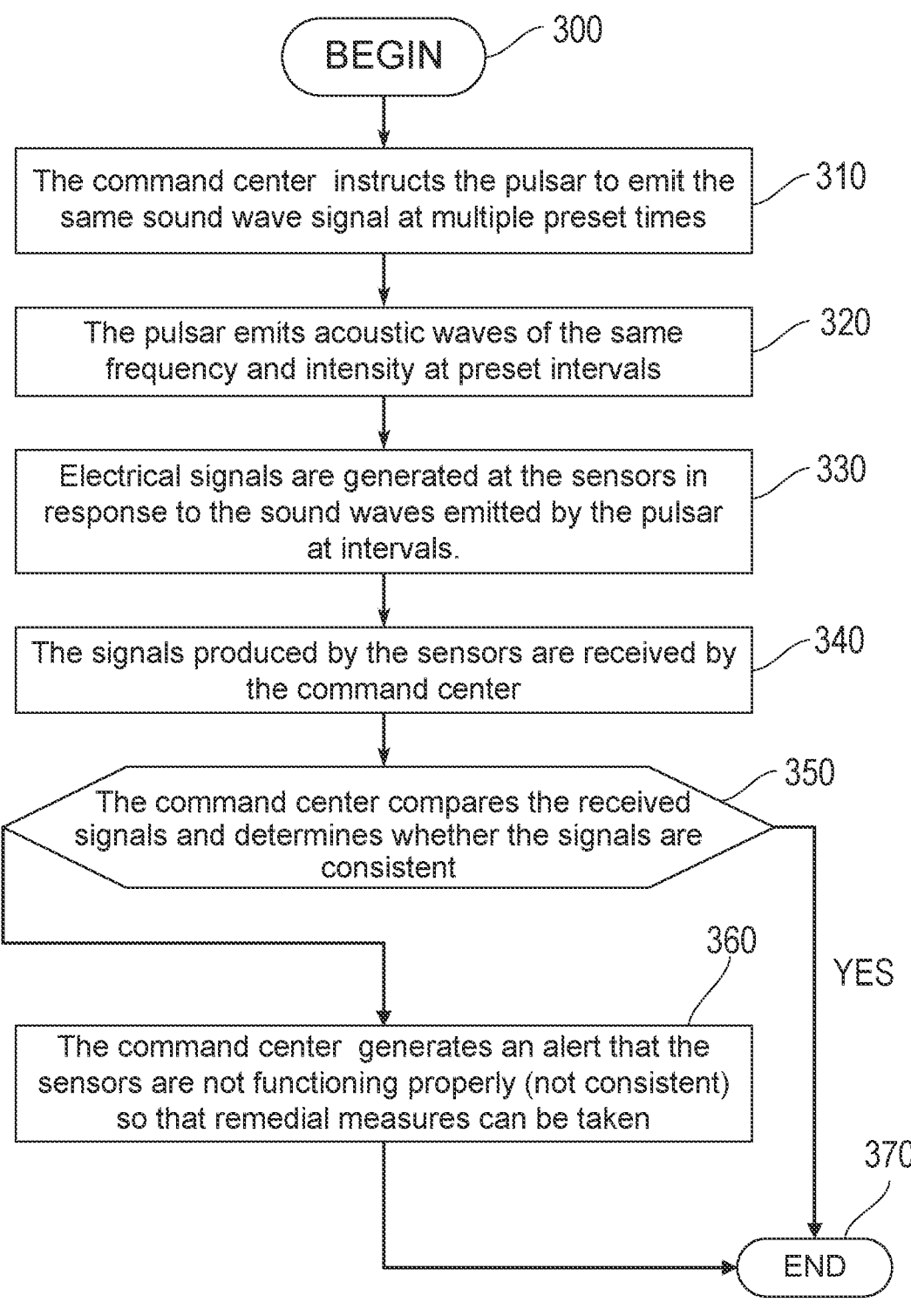
FIG. 3 is a flow chart of an embodiment of a second mode of auto-calibration of a system for continuous acoustic emission-based structural health monitoring according to the present disclosure.

FIG. 3 is a flow chart of an embodiment of a second mode of a method of auto-calibration of a system for continuous acoustic emission-based structural health monitoring according to the present disclosure. In the second mode, the system tests the reproducibility of the sensor output. The method begins in step 300. In a second step 310, the command center 140 instructs the pulsar 120 to emit the same sound wave signal at multiple preset times. In step 320, the pulsar emits acoustic waves of the same frequency and intensity at preset intervals. In step 330, electrical signals are generated at the sensors 132, 134, 136 in response to the sound waves emitted by the pulsar 120 at intervals. In step 340, the signals generated by the sensors 132, 134, 136 are received at the command center. In step 350, the command center 140 compares the received signals and determines whether the signals are similar and demonstrate measurement consistency and reproducibility. If, in step 350, the command center 140 determines that the signals are consistent, then the method ends in step 370. If, on the other hand, it is determined that the signals are not consistent, then in step 360, the command center 140 generates an alert that one or more the sensors 132, 134, 136 are not functioning properly so that remedial measures can be taken (e.g., one or more sensors can be subjected to further testing and/or replaced). The method then ends in step 370.

Figure 4:
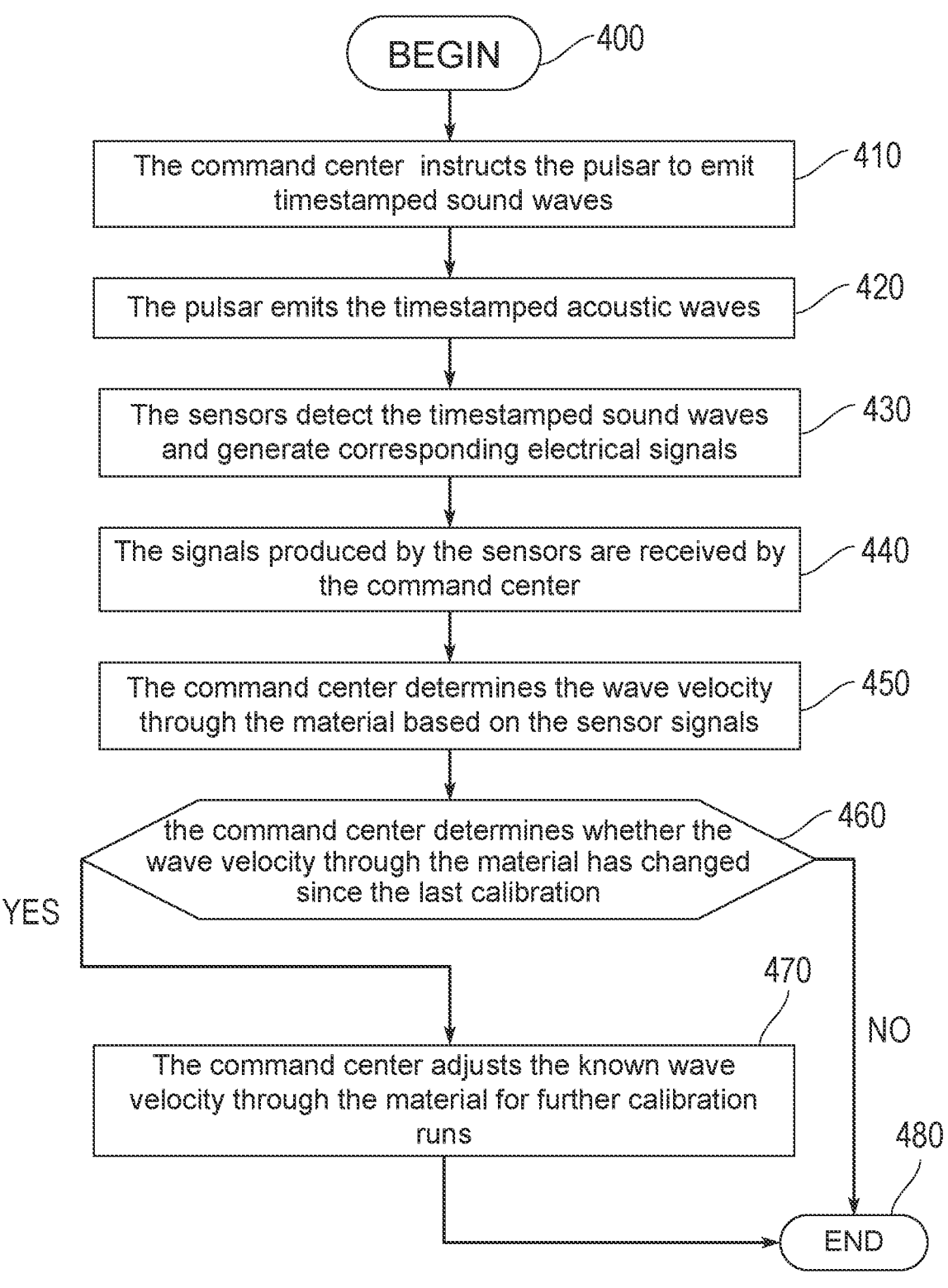
FIG. 4 is a flow chart of an embodiment of a third mode of auto-calibration of a system for continuous acoustic emission-based structural health monitoring according to the present disclosure.

FIG. 4 is a flow chart of an embodiment of a third mode of a method of auto-calibration of a system for continuous acoustic emission-based structural health monitoring according to the present disclosure. In the third mode, the system tests the reproducibility of the sensor output. the command center commands timestamps signals sent to the pulsar providing time data from which acoustic wave velocity can be determined. In this mode, the command center commands the pulsar to send a signal, timestamping the sent and received signals. The method begins in step 400. In step 410, the command center 140 sends instructions to the pulsar 120 to emit soundwaves carrying a timestamp indicating a precise time of emission. In step 420, the pulsar 120 emits the timestamped acoustic wave signals, and in step 430 the sensors 132, 134, 136 receive the signals emitted by the pulsar 120. The command center 140 receives the signals detected by the sensors 132, 134, 136 in step 440. Using known distances between the sensors 132, 134, 136 and timestamped signals, the command center computes the velocity of the sound waves through the material 110 in step 450. In step 460, the command center determines whether the wave velocity through the material has changed from a previous assessment of the wave velocity in a calibration run. If it is determined that the wave velocity through the material 110 has not changed, the method ends in step 470. If it is determined that the wave velocity through the material 110 has changed, in step the known wave velocity through the material is updated for further calibration runs. The wave velocity can change over time due to factors such as changes in operational parameters (e.g., temperature and pressure), aging of the material, or progression of the damage in the material itself. Accurate calibration of the system to provide accurate wave velocity through the material is quite important for system operation since the time delay in sound wave propagation introduced by the material can be used to triangulate the source of the acoustic wave. Thus, one of the main reasons continuous calibration is needed is because accurate wave velocity determination is critical for accurately localizing damage within the structure. By calculating this velocity, the system can determine the source of an acoustic emission, allowing for early detection and prevention of structural failure.

Figure 5:
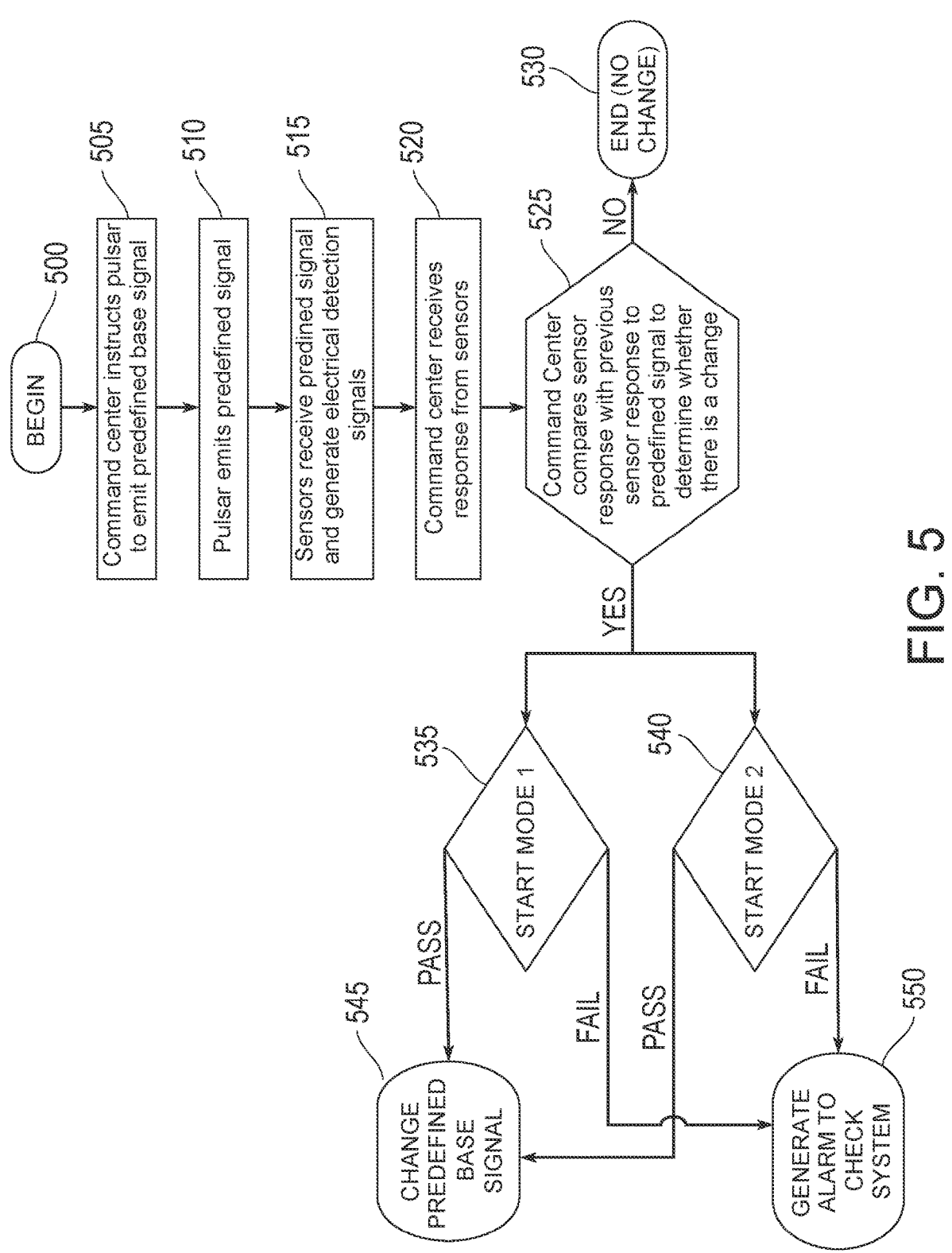
FIG. 5 is a flow chart of an embodiment of a fourth mode of auto-calibration of a system for continuous acoustic emission-based structural health monitoring according to the present disclosure.

FIG. 5 is a flow embodiment of a fourth mode of auto-calibration of a system for continuous acoustic emission-based structural health monitoring according to the present disclosure. The fourth mode involves the first and second modes, and is designed to maintain a calibrated base signal for emission over time. By regularly acquiring a working base signal, the system can recognize "expected distortion" that comes with material or environmental changes. In step 505 the command center 140 instructs the pulsar 140 to send a defined acoustic signal. In step 510, the pulsar 120 emits the defined base signal. In following step 515, the acoustic sensors 132, 134, 136 receive the defined signal and send corresponding electrical signals to the command center 140, which receives the detection signals in step 520. In step 525, the command center 140 compares the received signal with the previous response of the sensors to the predefined base signal to determine whether a change in sensor response has occurred. If no change is found in step 525, the method ends in step 530. If, in step 525, it is determined that there is a change in sensor response, the command center activates the first auto-calibration in step 535 and simultaneously or sequentially (before or after) activates the second auto-calibration in step 540. Activation of the first and second modes a change is done to confirm system sensitivity and reproducibility. If both sensitivity and reproducibility (both first and second modes PASS) then, in step 545, the command center defines and sets a new base signal is to be used for auto-calibration analysis. If either the sensitivity or reproducibility test of the first and second modes fail, then in step 545, the command center 140 generates an alarm to check the system components, including the sensors 132, 134, 136.

The disclosed system and associated methods of auto-calibration that perform auto-calibration present added value in the field of structural health monitoring. The use of a pulsar, multiple sensor, and a command center in proximity to the material to be monitored, along with the multiple auto-calibration modes ensures that the system maintains high sensitivity and reproducibility, accurately localizes damage, and identifies waveform distortions over time. The continuous calibration feature enables this system to provide reliable, accurate, and timely structural health data, thus enhancing efficiency across various sectors. The system's ability to provide early detection of structural damage and identify expected material or environmental changes is crucial in preventing potential catastrophic failures.

Another major advantage is that the systems and auto-calibration methods disclosed herein ensure continuous calibration, thus maintaining a consistent level of measurement accuracy and system reliability. Continuous calibration not only improves data quality but also saves time and reduces human intervention, making it more efficient and cost-effective in comparison to periodic calibration.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A structural health monitoring system coupled to a structural material to be monitored, the system comprising:
   a pulsar coupled to the structural material that is configured to emit acoustic waves;
   a plurality of acoustic wave sensors coupled to the structural material and to receive acoustic waves generated by the pulsar and propagated through the structural material; and
   a command center having at least one processor communicatively coupled to both the pulsar and the plurality of acoustic wave sensors, the command center being configured to control emissions of acoustic wave by the pulsar, to receive detection signals produced by the plurality of acoustic wave sensors, and to continuously calibrate the monitoring system including the pulsar and the plurality of acoustic wave sensors so as to reliably and accurately determine the structural health of the structural material in real time.

2. The structural health monitoring system of claim 1, wherein the command center is further configured to:
   instruct the pulsar to generate acoustic waves with a variety of frequencies and intensities; and
   assess a sensitivity of the plurality of acoustic wave sensors and the pulsar by determining whether signals produced by the plurality of acoustic wave sensors in response to the acoustic waves generated by the pulsar have a corresponding variety of frequencies and intensities.

3. The structural health monitoring system of claim 2, wherein the command center is further configured to generate an alert for a system check when it is determined that the signals produced by the plurality of acoustic wave sensors in response to the acoustic waves generated by the pulsar do not have a corresponding variety of frequencies and intensities.

4. The structural health monitoring system of claim 1, wherein the command center is further configured to:

instruct the pulsar to repeatedly generate acoustic waves with a single frequency and intensity at preset intervals; and assess a reliability of the plurality of acoustic wave sensors and the pulsar by determining whether signals produced by the plurality of acoustic wave sensors in response to the acoustic waves generated by the pulsar show a consistent frequency and intensity level.

5. The structural health monitoring system of claim 4, wherein the command center is further configured to generate an alert for a system check when it is determined that the signals produced by the plurality of acoustic wave sensors in response to the acoustic waves generated by the pulsar do not show a consistent frequency and intensity level.

6. The structural health monitoring system of claim 1, wherein the command center is further configured to:

instruct the pulsar to repeatedly generate acoustic waves with timestamps; and determine a velocity of acoustic waves through the structural material based on a known distance between each of the plurality of acoustic wave sensors and the pulsar and timestamps of the signals received by the plurality of acoustic wave sensors.

7. The structural health monitoring system of claim 6, wherein the command center is further configured to localize structural damage in the structural material, when present, based on the determined velocity of acoustic waves through the structural material.

8. The structural health monitoring system of claim 1, wherein the command center is further configured to:

execute a calibration according to a first mode which includes:

Instructing the pulsar to generate acoustic waves with a variety of frequencies and intensities; and assessing a sensitivity of the plurality of acoustic wave sensors and the pulsar by determining whether signals produced by the plurality of acoustic wave sensors in response to the acoustic waves generated by the pulsar have a corresponding variety of frequencies and intensities; and execute a calibration according a second mode which includes:

instructing the pulsar to repeatedly generate acoustic waves with a single frequency and intensity at preset intervals; and assessing a reliability of the plurality of acoustic wave sensors and the pulsar by determining whether signals produced by the plurality of acoustic wave sensors in response to the acoustic waves generated by the pulsar show a consistent frequency and intensity level.

9. The structural health monitoring system of claim 8, wherein the command center is further configured to:

instruct the pulsar to generate a defined base signal;

compare a response of the plurality of acoustic wave sensors to the base signal with a previous response of the plurality of acoustic wave sensors to the base signal; and when the response of the plurality of acoustic wave sensors to the base signal differs from the previous response, executing the calibrations according to the first and second modes.

10. The structural health monitoring system of claim 9, wherein the command center is further configured to change the base signal when it is determined that the sensitivity and reliability of the plurality of wave sensors are as expected.

11. A method of monitoring structural health of a system coupled to a structural material performed by a processor configured with computer-executable instructions, the method comprising:

Instructing a pulsar coupled to the structural material to emit acoustic waves;

receiving responses to the acoustic waves generated by the pulsar and propagated through the material from a plurality of acoustic wave sensors; and continuously calibrating the system, including the pulsar and the plurality of acoustic wave sensors, so as to reliably and accurately determine the structural health of the structural material in real time.

12. The method of claim 11, further comprising:

instructing the pulsar to generate acoustic waves with a variety of frequencies and intensities; and assessing a sensitivity of the plurality of acoustic wave sensors and the pulsar by determining whether signals produced by the plurality of acoustic wave sensors in response to the acoustic waves generated by the pulsar have a corresponding variety of frequencies and intensities.

13. The method of claim 12, further comprising generating an alert for a system check when it is determined that the signals produced by the plurality of acoustic wave sensors in response to the acoustic waves generated by the pulsar do not have a corresponding variety of frequencies and intensities.

14. The method of claim 11, further comprising:

instructing the pulsar to repeatedly generate acoustic waves with a single frequency and intensity at preset intervals; and assessing a reliability of the plurality of acoustic wave sensors and the pulsar by determining whether signals produced by the plurality of acoustic wave sensors in response to the acoustic waves generated by the pulsar show a consistent frequency and intensity level.

15. The method of claim 14, further comprising generating an alert for a system check when it is determined that the signals produced by the plurality of acoustic wave sensors in response to the acoustic waves generated by the pulsar do not show a consistent frequency and intensity level.

16. The method of claim 11, further comprising:

instructing the pulsar to repeatedly generate acoustic waves with timestamps; and determining a velocity of acoustic waves through the structural material based on a known distance between each of the plurality of acoustic wave sensors and the pulsar and timestamps of the signals received by the plurality of acoustic wave sensors.

17. The method of claim 16, wherein the command center is further configured to localize structural damage in the structural material, when present, based on the determined velocity of acoustic waves through the structural material.

18. The method of claim 11, further comprising:

executing a calibration according to a first mode which includes:

instructing the pulsar to generate acoustic waves with a variety of frequencies and intensities; and assessing a sensitivity of the plurality of acoustic wave sensors and the pulsar by determining whether signals produced by the plurality of acoustic wave sensors in response to the acoustic waves generated by the pulsar have a corresponding variety of frequencies and intensities; and executing a calibration according a second mode which includes:

instructing the pulsar to repeatedly generate acoustic waves with a single frequency and intensity at preset intervals; and assessing a reliability of the plurality of acoustic wave sensors and the pulsar by determining whether signals produced by the plurality of acoustic wave sensors in response to the acoustic waves generated by the pulsar show a consistent frequency and intensity level.

19. The method of claim 18, further comprising:

instructing the pulsar to generate a defined base signal;

comparing a response of the plurality of acoustic wave sensors to the base signal with a previous response of the plurality of acoustic wave sensors to the base signal; and when the response of the plurality of acoustic wave sensors to the base signal differs from the previous response, executing the calibrations according to the first and second modes.

20. The method of claim 19, further comprising changing the base signal when it is determined that the sensitivity and reliability of the plurality of wave sensors are as expected.

* * * * *